US011792726B2

(12) United States Patent
Soliman et al.

(10) Patent No.: US 11,792,726 B2
(45) Date of Patent: Oct. 17, 2023

(54) NETWORK SLICE CONFIGURATION FOR DEVICE TO DEVICE COMMUNICATION

(71) Applicant: Apple Inc., Cupertino, CA (US)

(72) Inventors: Ahmed M Soliman, Munich (DE); Krisztian Kiss, Cupertino, CA (US); Yu-Ting Yu, Cupertino, CA (US); Sudeep Manithara Vamanan, Nuremberg (DE)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 17/366,105

(22) Filed: Jul. 2, 2021

(65) Prior Publication Data

US 2022/0377654 A1 Nov. 24, 2022

Related U.S. Application Data

(60) Provisional application No. 63/185,156, filed on May 6, 2021.

(51) Int. Cl.
  *H04W 48/18* (2009.01)
  *H04W 28/08* (2023.01)
(52) U.S. Cl.
  CPC ....... *H04W 48/18* (2013.01); *H04W 28/0875* (2020.05)
(58) Field of Classification Search
  CPC .................... H04W 48/18; H04W 28/0875
  See application file for complete search history.

(56) References Cited

U.S. PATENT DOCUMENTS

| 2018/0054237 | A1* | 2/2018 | Tseng | H04W 72/542 |
| 2022/0322202 | A1* | 10/2022 | Li | H04M 15/8016 |
| 2022/0330361 | A1* | 10/2022 | Ding | H04W 40/22 |
| 2022/0369215 | A1* | 11/2022 | Dees | H04W 76/12 |

OTHER PUBLICATIONS

3GPP TR 23.752 V17.0.0; 3rd Generation Partnership Project; Technical Specification Group Services and System Aspects; Study on system enhancement for Proximity based Services (ProSe) in the 5G System (5GS); (Release 17) Mar. 2021; p. 2-184.

(Continued)

*Primary Examiner* — Luat Phung
(74) *Attorney, Agent, or Firm* — Eschweiler & Potashnik, LLC

(57) ABSTRACT

Systems, methods, and processors are provided for flexibly configuring network slices in device to device communication. In one example, a baseband processor for a relay user equipment (UE) is configured to cause the UE to receive a UE route selection policy (URSP) from a network. The URSP includes respective URSP rules for routing UE traffic through respective network slices to the network. A first URSP rule indicates whether an associated first network slice is designated for remote UE traffic, relay UE traffic, or both remote UE traffic and relay UE traffic. The baseband processor is configured to cause the UE to establish a device to device (D2D) connection with a remote UE to relay remote UE traffic from the remote UE to a base station and assign the remote UE traffic to at least one network slice based on the URSP.

20 Claims, 7 Drawing Sheets

(56) References Cited

OTHER PUBLICATIONS

3GPP TS 23.303 V16.0.0; 3rd Generation Partnership Project; Technical Specification Group Services and System Aspects; Proximity-based services (ProSe); Stage 2; (Release 16); Jul. 2020; p. 2-130.

3GPP TS 23.503 V17.0.0; 3rd Generation Partnership Project; Technical Specification Group Services and System Aspects; Policy and charging control framework for the 5G System (5GS); Stage 2; (Release 17); Mar. 2021; p. 2-123.

3GPP TS 24.526 V17.2.0; 3rd Generation Partnership Project;Technical Specification Group Core Network and Terminals; User Equipment (UE) policies for 5G System (5GS); Stage 3; (Release 17); Mar. 2021; p. 2-53.

\* cited by examiner

# NETWORK SLICE CONFIGURATION FOR DEVICE TO DEVICE COMMUNICATION

CROSS REFERENCE TO RELATED APPLICATIONS

This application claims the benefit of priority under 35 USC § 119 from U.S. Provisional Patent Application Ser. No. 63/185,156, entitled NETWORK SLICE CONFIGURATION FOR DEVICE TO DEVICE COMMUNICATION, filed on May 6, 2021, the subject matter of which is incorporated herein by reference for all purposes.

BACKGROUND

Each year, the number of mobile devices connected to wireless networks significantly increases. Adjustments are being made to system requirements in order to be able to meet these demands. One technique for providing additional bandwidth is to utilize device to device (D2D) communication in licensed or unlicensed portions of the spectrum. D2D communication can reduce or eliminate communication with base stations which reduces RAN congestion. D2D communication may also be used to extend the range of a RAN by having user equipment (UE) devices that are within radio range of a base station act as relay devices for UEs outside range of the base station.

Network slicing refers to the selection and allocation of network resources to suit the requirements of a specific service. For example, some applications are likely to require high throughputs and a UE application using such a service should be allocated a network slice including network resources that support high throughputs. In contrast, other applications require low latency and should be allocated different network resources that are optimized for low latency. Quality of service (QoS) for various UEs and applications may also be a consideration in selecting network slices for different services.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 1:
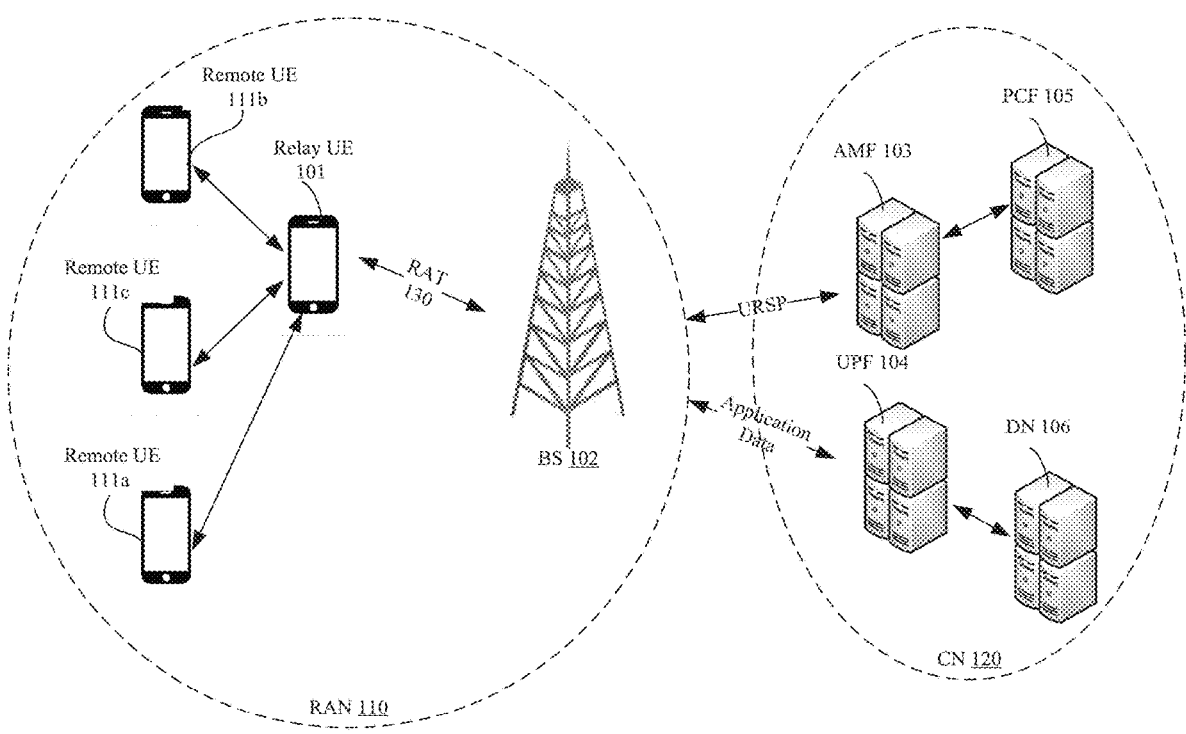
FIG. 1 illustrates an example communication network, in accordance with various aspects disclosed.

FIG. 1 shows an exemplary wireless communication system supporting flexible routing selection for a relay UE 101 that relays network traffic for one or more remote UEs (111a-111c). The wireless communication system 100 can be a 5G new radio (NR) network including the UE 101, UEs 111a-111c, base station (BS) 102, an access and mobility management function (AMF) 103, a policy control function (PCF) 105, a user plane function (UPF) 104, and a data network (DN) 106. The UE 101 and BS 102 are part of a radio access network (RAN) 110. The AMF 103, PCF 105, UPF 104, and DN 106 are part of a core network (CN) 120. The CN 120 may be considered as including network nodes associated with a control plane (e.g. AMF 103 and PCF 105) and network nodes associated with a user plane (e.g., UPF 104 and DN 106). The UE 101 and/or 111 can be a smart phone, a wearable device, an Internet of Things (IoT) device, a tablet, and the like. The BS 102 can be a 5G gNB, 4G LTE eNB, and the like.

In the access stratum (AS) layer, the RAN 110 can provide radio access for the relay UE 101 via a radio access technology (RAT) 130 such as Bluetooth, WiFi, GSM, UMTS, LTE, or 5G NR. In non-access stratum (NAS) the AMF 103 can communicate with the BS 102 or the RAN 110 to manage the connections of the UEs in the communication network. The PCF 105 can provide access and mobility management related policies to the AMF 103. The UPF 104 can communicate with the BS 102 or the RAN 110 and the DN 106 can communicate with the UPF 104.

Data traffic can be delivered in internet protocol (IP) packets, such as a protocol data unit (PDU) session. The PDU session defines an association between a UE (e.g., relay UE 101) and the DN 106 that provides a PDU connectivity service. The PDU connectivity service provides exchange of PDUs between the UE and the DN 106. Each PDU session can include a PDU session ID and one or more QoS flows and QoS rules.

When a connected UE triggers an application, outgoing traffic associated with the application can be routed according to a UE route selection policy (URSP) that is determined by the PCF 105 and provided to the UE by the AMF 103. The URSP includes URSP rules that define how different types of traffic are to be routed, for example through which network slices. According to the URSP, the outgoing traffic can be routed to an established PDU session, may be offloaded to a non-3GPP access outside a PDU session, or a new PDU session may be established for the outgoing traffic. It is noted that the same network slice may support more than one PDU session.

Each URSP rule may include a rule precedence value, a traffic descriptor, and one or more route selection descriptors (RSDs). The rule precedence value of the URSP rule identifies a precedence of the URSP rule among the other URSP rules in the URSP. The rule precedence value for each URSP is different from the rule precedence value for other URSP rules in the URSP. The rule precedence determines an order in which the one or more URSP rules are enforced by the UE that triggers the application when selecting/establishing a PDU session for the outgoing traffic.

The traffic descriptor of a URSP rule specifies a matching criteria that is matched against the application that is triggered by the UE. The traffic descriptor may list one or more application identifiers and/or one or more data network names. The RSD of the URSP rule identifies one or more network slices (e.g. one or more single network slice selection assistance information (S-NSSAIs)), one or more DNNs, and one PDU session type, among other items.

When the UE triggers an application, the UE evaluates the URSP rules it has received from the core network. The UE evaluates the URSP rules in the order of rule precedence until a rule is located that has a traffic descriptor that matches the traffic associated with the triggered application. Once a URSP rule has been identified, the UE searches for an existing PDU session that matches the RSD of the URSP rule. If an existing PDU session that matches the RSD of the URSP rule does not exist, the UE may establish a new PDU session that matches the RSD.

The routing process performed by a UE becomes more complex when the UE is serving as a relay UE for one or more remote UEs. For example, the core network may designate certain network slices for relay UE traffic only (e.g., traffic originating with the relay UE 101), for remote (relayed) UE traffic only, or for both relay UE traffic and remote UE traffic (hereinafter this distinction between relay UE traffic and remote UE traffic will be denoted by "traffic source"). The relay UE should be aware of any routing limitations based on traffic source when selecting a PDU session for a remote UE. However, existing URSP do not provide a mechanism for designating network slices for different traffic sources.

Described herein are systems, methods, and circuitries that provide a mechanism for a network to communicate a traffic source parameter for different network slices to a UE. For example, a URSP may include a traffic source parameter or element that has a value that can be set to indicate any one of relay UE traffic, remote UE traffic, or both local and remote traffic.

Figure 2:
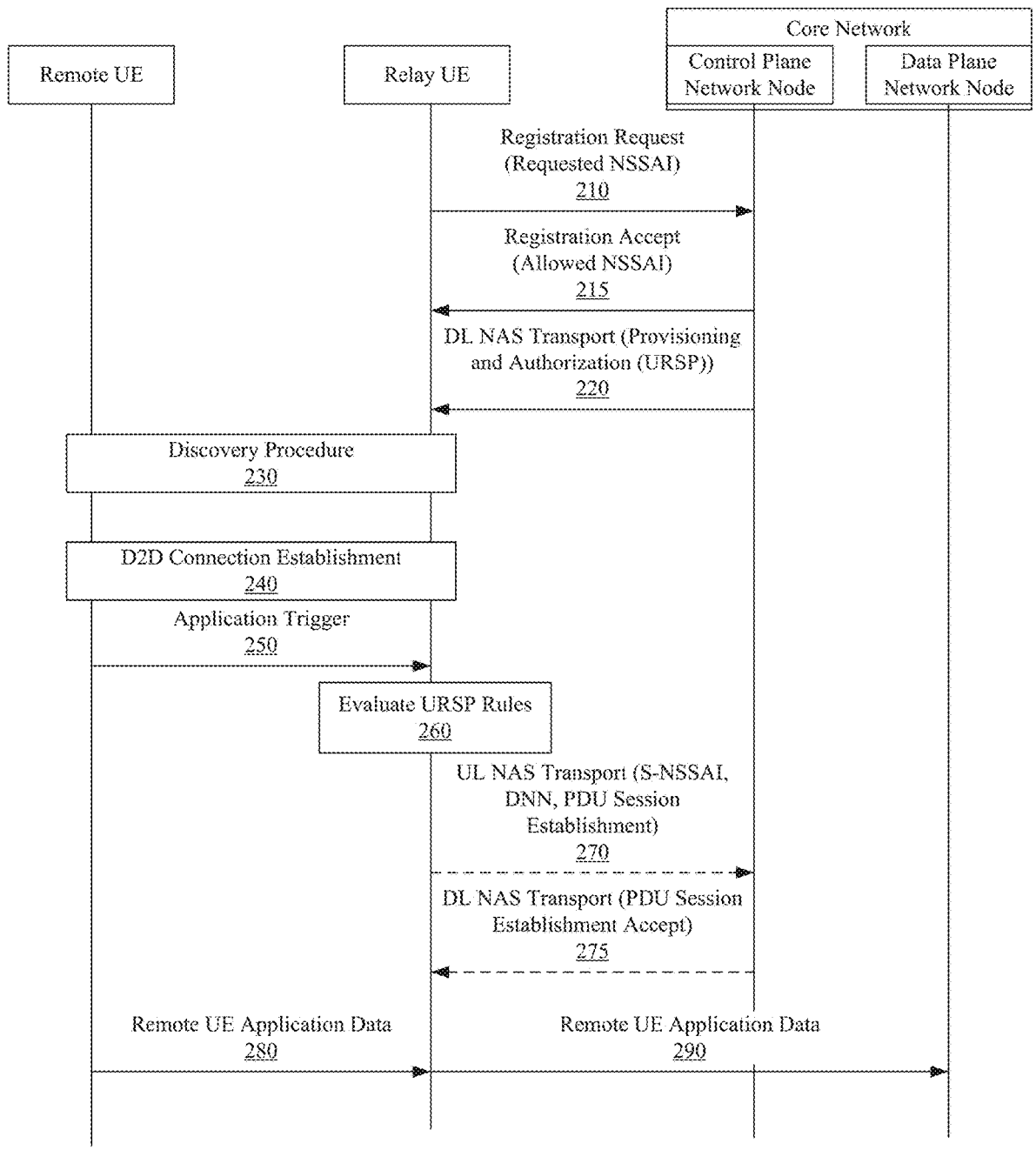
FIG. 2 is message flow diagram illustrating example operation of a UE serving as a relay device for a remote UE, according to various aspects disclosed.

FIG. 2 is a message flow diagram outlining an example of D2D communication. At 210 the UE that will serve as the relay UE (e.g., UE 101 of FIG. 1) performs an initial registration with a control plane network node to register with the core network. This may be performed by transmitting a Registration Request that includes a list of one or more Requested NSSAIs. The Registration Request also informs the core network about UE's relay capability. The core network performs an authentication procedure and if the core network accepts the Registration Request, at 215 the control plane network node sends a Registration Accept message that includes a list of Allowed NSSAIs that may be used by the UE.

At 220 the control plane network node sends a downlink (DL) NAS Transport message to the relay UE that includes authorization and provisioning information that includes the URSP. As described above, the URSP is used by the relay UE to determine if outgoing traffic associated with a given application can be associated with an existing PDU session or can be offloaded to a non-3GPP access outside a PDU session, or that a new PDU session should be established for the outgoing traffic. The relay UE will evaluate the URSP for its own traffic and also any remote UE traffic that is routed through the relay UE acting as relay. The URSP includes traffic source information that indicates which network slices are designated for use for traffic generated by the relay UE only, a remote UE only, or both the relay UE and the remote UE.

At 230 a remote UE (e.g., UE 111 of FIG. 1) discovers the relay UE through a discovery process. In one example the discovery process includes the relay UE broadcasting a list of services that the relay UE supports as a relay UE. In another example, the remote UE broadcasts a query that lists its intended services and the relay UE responds to the query if the relay UE supports the listed services. At 240 the remote UE selects and establishes a D2D connection (e.g., by way of the ProSe protocol) with the local relay. At 250, the remote UE triggers an application that will generate an associated traffic flow.

At 260 the relay UE evaluates the URSP rules (including the traffic source designation for the different network slices) to determine if an existing PDU session can be used for the remote UE's traffic. If no PDU session meets the RSD of a URSP rule that matches the traffic description of the triggered application, at 270 the local UE sends an uplink (UL) NAS Transport message that requests establishment of a PDU session with an identified S-NSSAI and DNN. At 275 the control plane network node transmits a DL NAS Transport message that accepts the establishment of the PDU session. At 280 the remote UE transmits application data to the relay UE and at 290 the relay UE uses the PDU session that meets the RSD of the selected rule to transmit the remote UE application data to a user plane network node.

Figure 3:
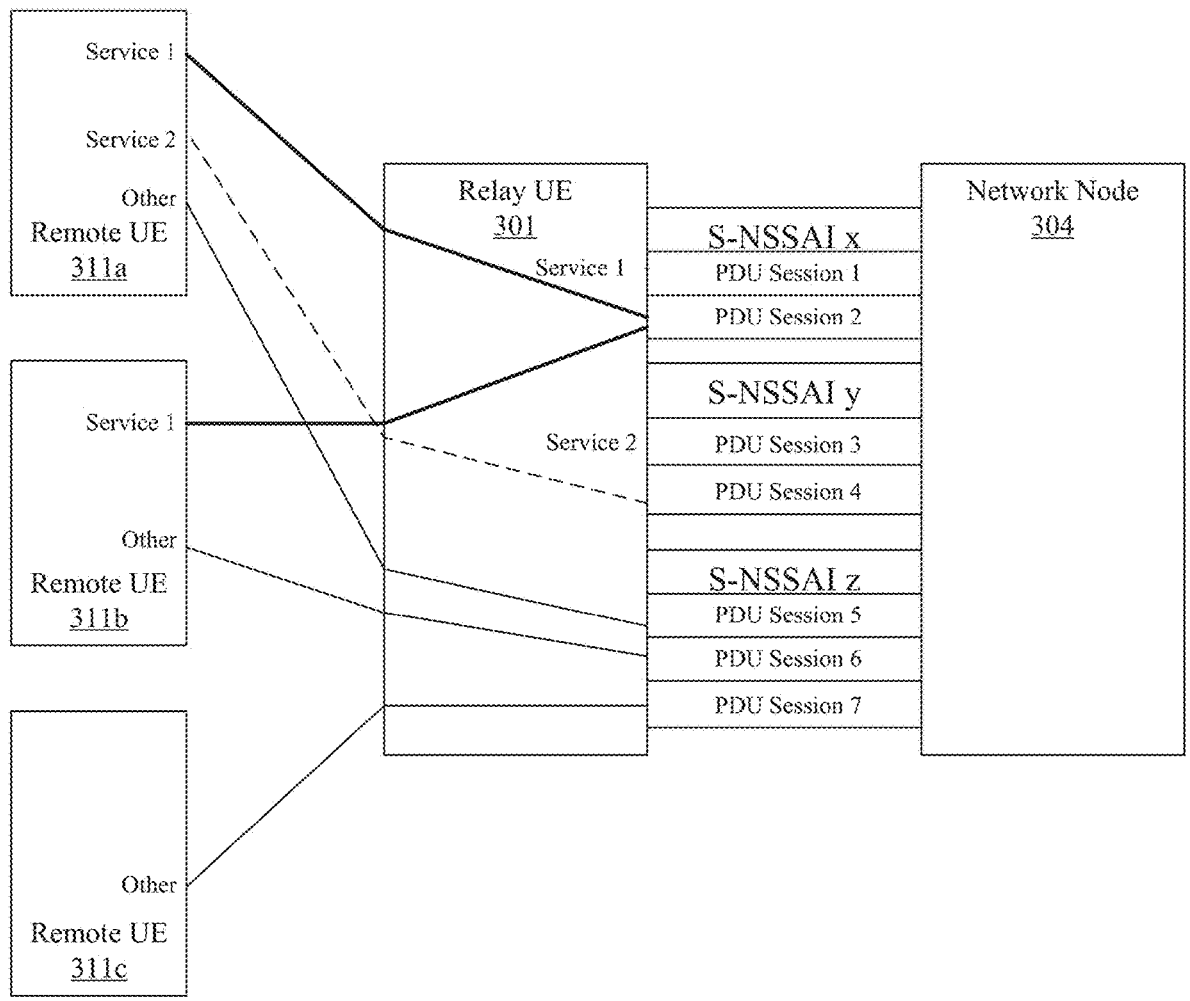
FIG. 3 is a block diagram illustrating a first use case in which a relay UE routes remote UE traffic through network slices, according to various aspects disclosed.
Figure 4:
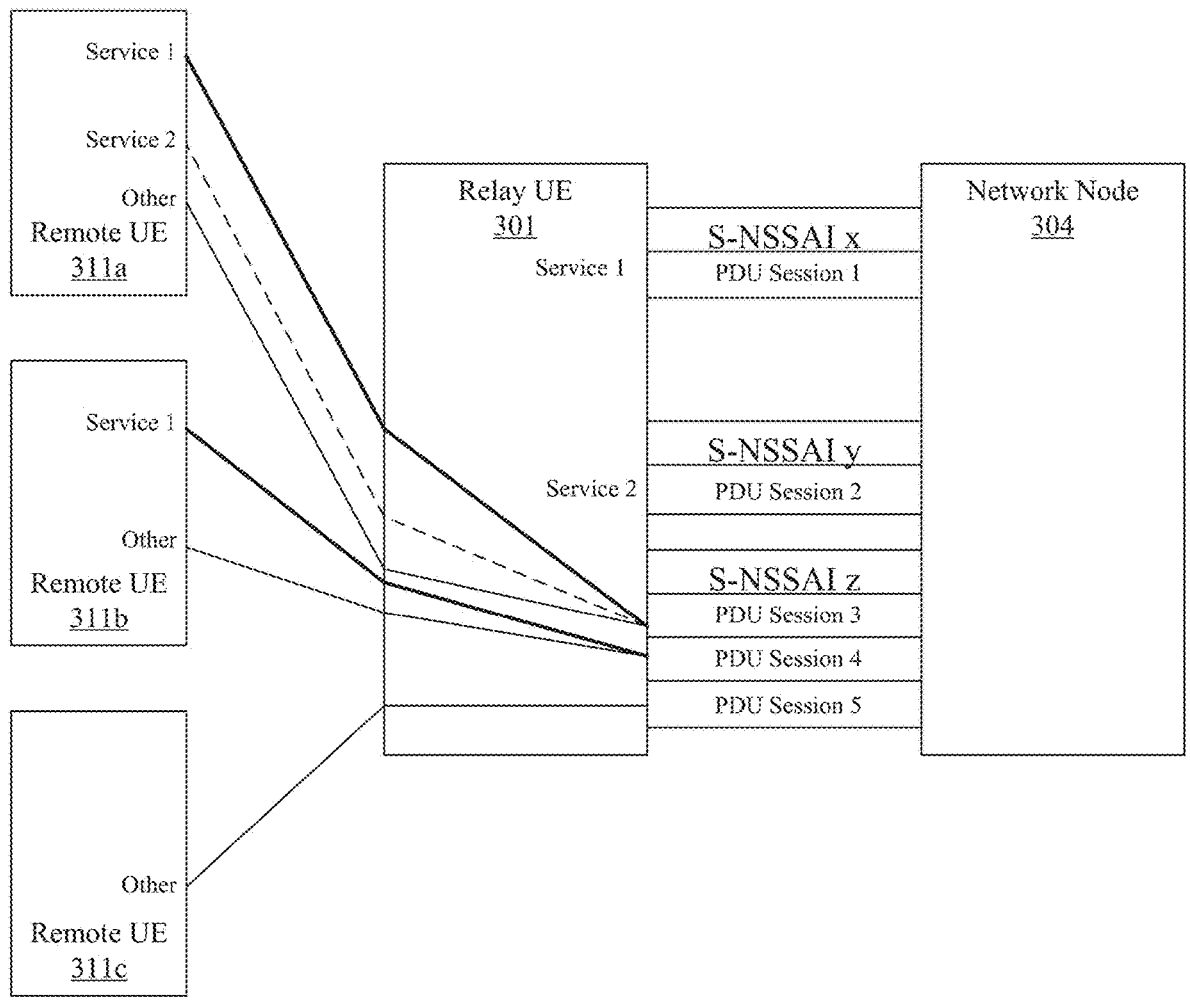
FIG. 4 is a block diagram illustrating a second use case in which a relay UE routes remote UE traffic through network slices, according to various aspects disclosed.
Figure 5:
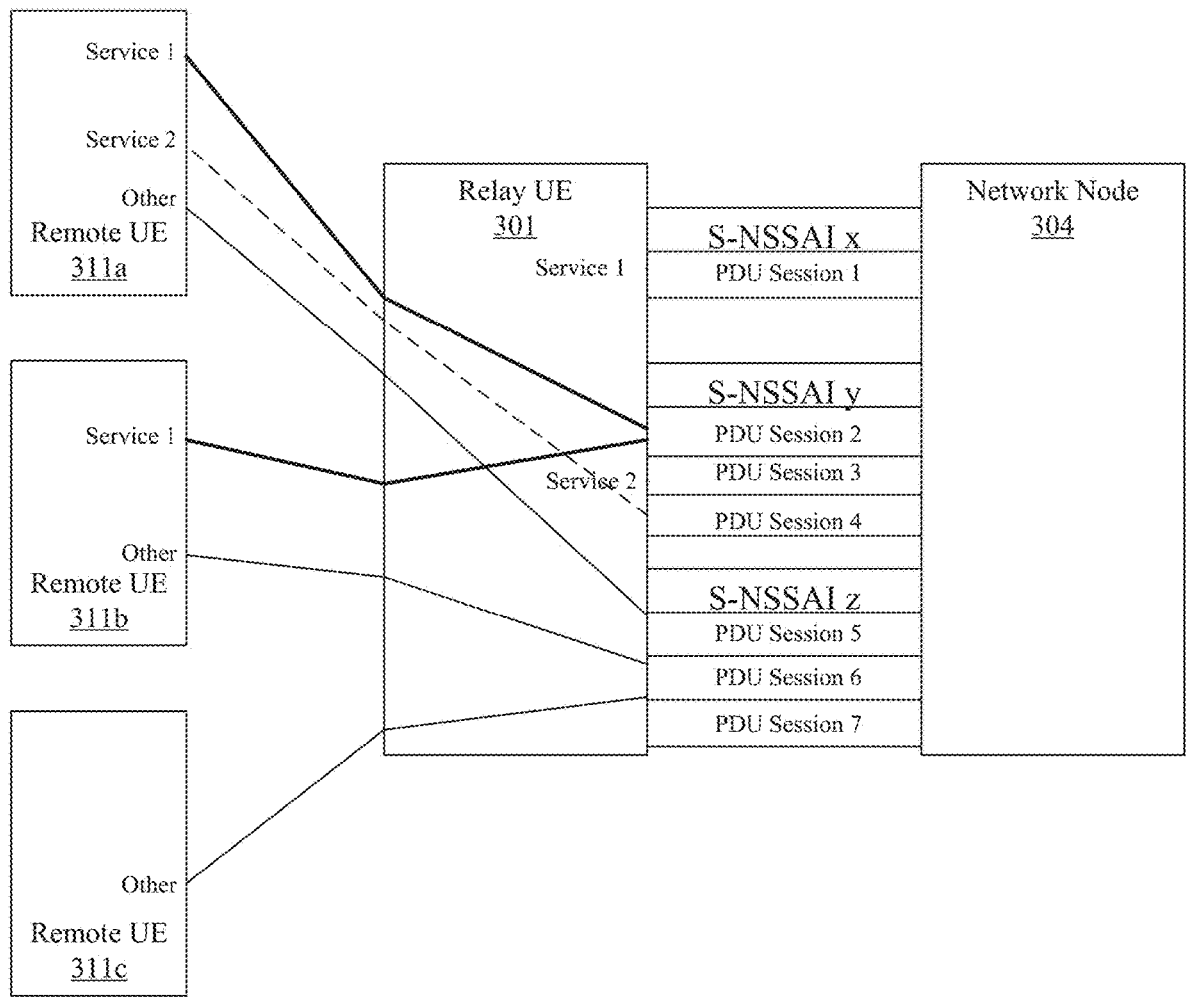
FIG. 5 is a block diagram illustrating a third use case in which a relay UE routes remote UE traffic through network slices, according to various aspects disclosed.

FIGS. 3-5 illustrate three example use cases in which the core network determines to designate certain slices with certain traffic sources (e.g., either relay UE only, remote UE only, or both relay UE and remote UE). In use cases illustrated in FIGS. 3-5 relay UE 301 has applications related to Service 1 and Service 2. Remote UE 311*a* has applications related to Service 1, Service 2, and other services. Remote UE 311*b* has applications related to Service 1 and applications related to other services. Remote UE 311*c* has no applications associated with either Service 1 or Service 2.

FIG. 3 illustrates a first use case in which the core network determines to share network slices between remote UEs and the relay UE. Network slice S-NSSAI x is dedicated to Service 1, S-NSSAI y is dedicated to Service 2, and S-NSSAI z is a default slice (for traffic descriptor "match all"). Relay UE 301 establishes a PDU session 1 for Service 1 that is linked with S-NSSAI x and PDU session 3 for Service 2 that is linked with S-NSSAI y.

In one example, the relay UE 301 establishes three different PDU sessions for the remote UE 311*a*, PDU Session 2 (which is shared with remote UE 311*b*) for Service 1 that is linked with S-NSSAI x, PDU Session 4 for Service 2 that is linked with S-NSSAI y, and PDU Session 5 for any other services that is linked with S-NSSAI z. For remote UE 311*b*, the relay UE 301 uses PDU session 2 for Service 1 that is linked with S-NSSAI x and establishes PDU session 6 for any other services that is linked with S-NSSAI z. The relay UE 301 establishes PDU session 7 that is linked with S-NSSAI z for other services for remote UE 311*c*.

In the first use case shown in FIG. 3, the same slice can be linked to PDU sessions for relay UE applications and remote UE applications as shown by S-NSSAI x which is linked to PDU session 1 for relay UE Service 1 and also PDU session 2 for remote UE 311*a* Service 1.

FIG. 4 illustrates a second use case in which the core network determines to provide a first network slice S-NSSAI x designated for relay UE Service 1 only, a second network slice S-NSSAI y designated for relay UE Service 2 only and a third network slice S-NSSAI z designated for remote UEs only. In one example, in this use case, relay UE 301 establishes PDU session 1 for relay UE Service 1 traffic linked to S-NSSAI x and PDU session 2 for relay UE Service 2 traffic linked to S-NSSAI y. The relay UE establishes PDU session 3 linked to S-NSSAI z for all traffic from remote UE 311a, PDU session 4 linked to S-NSSAI z for all traffic from remote UE 311b, and PDU session 5 linked to S-NSSAI z for all traffic from remote UE 311c.

FIG. 5 illustrates a third use case in which the core network determines to provide a first network slice S-NSSAI x designated for the relay UE traffic for Service 1 only, a second network slice S-NSSAI y designated for both relay UE and remote UE traffic for Service 2 and remote UE traffic for Service 1, and a third network slice S-NSSAI z designated for both relay UE and remote UE traffic for other services. In one example, in this use case the relay UE establishes PDU session 1 for relay UE Service 1 linked to S-NSSAI x and PDU session 3 for relay UE service 2 linked to S-NSSAI y. The relay UE establishes a PDU session 2 for remote UE 311a Service 1 traffic and remote UE 311b Service 1 traffic. The relay UE establishes PDU session 4 for remote UE 311a Service 2 traffic. With respect to S-NSSAI z, the relay UE establishes PDU session 5 for remote UE 311a other service traffic, PDU session 6 for remote UE 311b other service traffic, and PDU session 7 for remote UE 311c other service traffic.

FIGS. 3-5 illustrate three example use cases in which the core network determines to designate certain slices with certain traffic sources (e.g., either relay UE only, remote UE only, or both relay UE and remote UE). Various mechanisms for communicating this traffic source designation (e.g., via URSP) are provided as follows.

Traffic Source Parameter in Route Selection Descriptor

In one example, to communicate a traffic source limitation or configuration for a network slice, a traffic source parameter is added to the RSD in the URSP rules as part of route selection validation criteria. A traffic source element may be included in the RSD that can take on any of the following values: relay UE traffic, remote (or relayed) UE traffic only, or both local and remote (or relayed) UE traffic. In this example, during the discovery procedure the relay UE informs remote UEs about the services supported by network slices allowed for transmission of remote UE traffic. The relay UE will not inform remote UEs (or answer queries from remote UEs) about services supported by network slices that are designated for relay UE traffic only.

To communicate the traffic source designations for the network slices for use case 1 of FIG. 3, the core network would i) set the traffic source element in the RSD validation criteria for the rule for S-NSSAI x to a value that indicates local and remote UE traffic; ii) set the traffic source element in the RSD validation criteria for the rule for S-NSSAI y to a value that indicates both local and remote UE traffic; and iii) set the traffic source element in the RSD validation criteria for the rule for S-NSSAI z to a value that indicates local and remote UE traffic.

To communicate the traffic source designations for the network slices for use case 2 of FIG. 4, the core network would i) set the traffic source element in the RSD validation criteria for the rule for S-NSSAI x to a value that indicates relay UE traffic; ii) set the traffic source element in the RSD validation criteria for the rule for S-NSSAI y to a value that indicates relay UE traffic; and iii) set the traffic source element in the RSD validation criteria for the rule for S-NSSAI z to a value that indicates remote UE traffic.

To communicate the traffic source designations for the network slices for use case 3 of FIG. 5, the core network would i) set the traffic source element in the RSD validation criteria for the rule for S-NSSAI x to a value that indicates relay UE traffic; ii) set the traffic source element in the RSD validation criteria for the rule for S-NSSAI y to a value that indicates both local and remote UE traffic; and iii) set the traffic source element in the RSD validation criteria for the rule for S-NSSAI z to a value that indicates both local and remote UE traffic.

In one example, to avoid adding the traffic source element to every rule, the absence of the traffic source element may be interpreted as relay UE traffic only. Table 1 illustrates exemplary changes (shown in bold and italic font) to mapping table 4.4.2.2 of TS 24.526 to provide a traffic source parameter in the route selection descriptor.

TABLE 1

| Route selection descriptor parameter name | Description | Mapped EPS parameter description |
| --- | --- | --- |
| Route selection descriptor precedence | Determines the order in which the route selection descriptors are to be applied | Determines the order in which the route selection descriptors are to be applied |
| SSC Mode Selection | One single value of SSC mode | Ignored in EPS if set to SSC mode 1<br>Not applicable in EPS if set to SSC mode 2 or 3 |
| Network Slice Selection | Either a single value or a list of values of S-NSSAI(s) | Not applicable in EPS |
| DNN Selection | Either a single value or a list of values of DNN(s) | Either a single value or a list of values of APN(s).<br>Not applicable in EPS if it contains at least one LADN DNN |
| PDU Session Type Selection | One single value of PDU Session Type | PDN type:<br>PDU session type "Unstructured" is mapped to PDN type "non-IP".<br>PDU session type "Ethernet" is mapped to PDN type "Ethernet", if supported by the UE. Otherwise PDU session type "Ethernet" is mapped to PDN type "non-IP" |

TABLE 1-continued

| Route selection descriptor parameter name | Description | Mapped EPS parameter description |
|---|---|---|
| Non-Seamless Offload indication | Indicates if the traffic of the matching application is to be offloaded to non-3GPP access outside of a PDU session | Indicates if the traffic of the matching application is to be offloaded to non-3GPP access outside of a PDN connection |
| Access Type preference | Indicates the preferred Access Type (3GPP or non-3GPP) when the UE establishes a PDU Session for the matching application | preferred Access Type (3GPP or non-3GPP) |
| Multi-Access preference | Indicates that the PDU session should be established as a multi-access PDU session, using both 3GPP access and non-3GPP access. | Not applicable in EPS |
| Time window | The time window when the matching traffic is allowed. | Not applicable in EPS |
| Location criteria | The UE location where the matching traffic is allowed. | Not applicable in EPS |
| *traffic source* | *The traffic source where the matching traffic is allowed (Local traffic, Relayed traffic, Both Local and Relayed traffic).* | Not applicable in EPS |

Table 2 illustrates exemplary changes (shown in bold and italic font) to table A-1 "Examples of URSP Rules" of TS 23.503 to support a traffic source parameter in the route selection descriptor.

TABLE 2

| | Example URSP rules | Comments |
|---|---|---|
| Rule Precedence =1<br>Traffic Descriptor:<br>Application Identifiers=App1 | Route Selection Descriptor Precedence=1<br>Network Slice Selection: S-NSSAI-a<br>SSC Mode Selection: SSC Mode 3<br>DNN Selection: internet<br>Access Type preference: 3GPP access | This URSP rule associates the traffic of application "App1" with S-NSSAI-a, SSC Mode 3, 3GPP access and the "internet" DNN.<br>It enforces the following routing policy:<br>The traffic of App1 should be transferred on a PDU session supporting S-NSSAI-a, SSC Mode 3 and DNN=internet over 3GPP access.<br>If this PDU session is not established, the UE shall attempt to establish a PDU session with S-NSSAI-a, SSC Mode 3 and the "internet" DNN over 3GPP access. |
| Rule Precedence =2<br>Traffic Descriptor:<br>Application Identifiers=App2 | Route Selection Descriptor Precedence =1<br>Network Slice Selection: S-NSSAI-a<br>Access Type preference: Non-3GPP access<br>Route Selection Descriptor Precedence =2<br>Non-seamless Offload indication: Permitted (WLAN SSID-a) | This URSP rule associates the traffic of application "App2" with S-NSSAI-a and Non-3GPP access.<br>It enforces the following routing policy:<br>The traffic of application App2 should be transferred on.<br>a PDU session supporting S-NSSAI-a using a Non-3GPP access. If this PDU session is not established, the UE shall attempt to establish a PDU session with S-NSSAI-a over Access Type=non-3GPP access.<br>If the PDU session cannot be established, the traffic of App2 shall be directly offloaded to WLAN, if the UE is connected to a WLAN with SSID-a (based on the 2nd RSD) |
| Rule Precedence =3<br>Traffic Descriptor:<br>DNN=DNN_1 | Route Selection Descriptor Precedence =1<br>Network Slice Selection: S-NSSAI-a<br>Access Type preference: Non-3GPP access | This URSP rule associates the traffic of applications that are configured to use DNN_1 with DNN_1, S-NSSAI-a over Non-3GPP access.<br>It enforces the following routing policy:<br>The traffic of application(s) that are configured to use DNN_1 should be transferred on a PDU session supporting S-NSSAI-a over Non-3GPP access. If this PDU session is not established, the UE shall attempt to establish the PDU session with S-NSSAI-a over Non-3GPP access. |
| Rule Precedence =4<br>Traffic Descriptor:<br>Application Identifiers=App1<br>Connection Capabilities="internet", | Route Selection Descriptor Precedence =1<br>Network Slice Selection: S-NSSAI-a<br>DNN Selection: DNN_1 | This URSP rule associates the application "App1" and the Connection Capabilities "internet" and "supl" with DNN_1, S-NSSAI-a over Non-3GPP access.<br>It enforces the following routing policy:<br>When the "App1" requests a network connection |

TABLE 2-continued

| Example URSP rules | | Comments |
|---|---|---|
| "supl" | Access Type preference: Non-3GPP access | with Connection Capability "internet" or "supl", the UE establishes (if not already established) a PDU session with DNN_1 and S-NSSAI-a over Non-3GPP access. After that, the UE routes the traffic of "App1" over this PDU session. |
| Rule Precedence =5 Traffic Descriptor: Application Identifiers=App3 Connection Capabilities="ims" | Route Selection Descriptor Precedence =1 Network Slice Selection: S-NSSAI-c DNN Selection: DNN_1 Access Type preference: Multi-Access | This URSP rule associates the application "App3" and the Connection Capability "ims" with DNN_1, S-NSSAI-c and multi-access connectivity. It enforces the following routing policy: When the "App3" requests a network connection with Connection Capability "ims", the UE establishes (if not already established) a MA PDU Session with DNN_1 and S-NSSAI-c. After that, the UE routes the traffic of "App3" over this MA PDU Session by using the received ATSSS rules. |
| Rule Precedence =6 Traffic Descriptor: Application Identifiers=App1 | Route Selection Descriptor Precedence =1 DNN Selection: DNN_1 Network Slice Selection: S-NSSAI-a Access Type preference: Multi Access | This URSP rule associates App 1 with DNN_1, S-NSSAI-a with Multi Access connectivity. It enforces the following routing policy: The traffic of Application 1 should be transferred on a PDU session supporting S-NSSAI-a and DNN_1 according to the received ATSSS rules. After that the UE routes the traffic of any other application according to the ATSSS rule with match all packet filters if available. |
| *Rule Precedence = 7* *Traffic Descriptor:* *DNN=DNN_2* | *Route Selection Descriptor* *Precedence =1* *Network Slice Selection: S-NSSAI-a* *Access Type preference: 3GPP access* *traffic source: Relayed and Local Traffic* | *This URSP rule associates the traffic of applications that are configured to use DDN_2 with DNN_2, S-NSSAI-a over 3GPP access.* *This Rule is applicable for Relayed and Local Traffic* |
| Rule Precedence = lowest priority Traffic Descriptor: * | Route Selection Descriptor Precedence = 1 Network Slice Selection: S-NSSAI-b SSC Mode Selection: SSC Mode 3 DNN Selection: internet *traffic source: Relayed and Local Traffic* | This URSP rule associates all traffic not matching any prior rule a PDU Session with S-NSSAI-b, SSC Mode 3 and the "internet" DNN. It enforces the following routing policy: All traffic not matching any prior rule should be transferred on a PDU session supporting S-NSSAI-b, SSC Mode 3 and DNN=internet with no access network preference. *This Rule is applicable for Relayed and Local Traffic* |

Traffic Source Parameter in Traffic Descriptor

In another example, the traffic source parameter is added to the traffic descriptor in the URSP rules. The traffic source parameter is indicated by a traffic source element that can have a value that indicates relay UE, remote UE, or both local and remote UE traffic. A URSP rule that has the traffic source parameter and also includes other elements of a traffic descriptor will be evaluated by the relay UE for remote UE traffic against traffic descriptor information obtained from the remote UE (when triggering an application). This convention supports use cases 1 and 3 of FIGS. 3 and 5, respectively. A URSP rule that includes the traffic source parameter set to remote UE traffic and includes no other elements of a traffic descriptor is used by the relay UE to route all traffic from remote UEs to the corresponding RSD (e.g., network slice). This convention supports use case 2 of FIG. 4. Table 3 illustrates exemplary changes (shown in bold and italic font) to mapping table 4.4.2.1 of TS 24.526 to support a traffic source parameter in the traffic descriptor.

TABLE 3

| Traffic descriptor parameter name | Description | Mapped EPS parameter description |
|---|---|---|
| Application descriptors | It consists of OSId and OSAppId(s) | OSId and OSAppId(s) |
| IP descriptors | Destination IP 3 tuple(s) (IP address or IPv6 network prefix, port number, protocol ID of the protocol above IP) | Destination IP 3 tuple(s) (IP address or IPv6 network prefix, port number, protocol ID of the protocol above IP) |
| Domain descriptors | Destination FQDN(s) or a regular expression as a domain name matching criteria | Destination FQDN(s) or a regular expression as a domain name matching criteria |
| Non-IP descriptors | Descriptor(s) for destination information of non-IP traffic | Descriptor(s) for destination information of non-IP traffic |
| DNN | This is matched against the DNN information provided by the application | APN |

TABLE 3-continued

| Traffic descriptor parameter name | Description | Mapped EPS parameter description |
|---|---|---|
| Connection Capabilities | This is matched against the information provided by a UE application when it requests a network connection with certain capabilities | This is matched against the information provided by a UE application when it requests a network connection with certain capabilities |
| *traffic source* | *This is matched against the traffic source (Local traffic, Relayed traffic, Both Local and Relayed traffic ).* | Not applicable in EPS |

Figure 6:
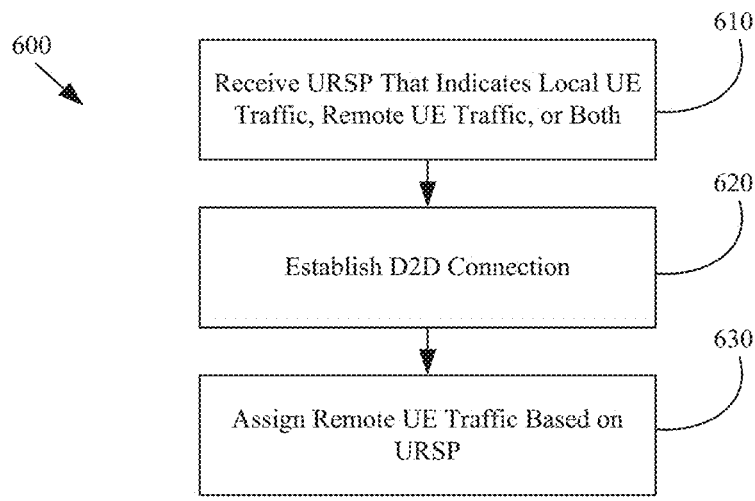
FIG. 6 is a flow diagram illustrating an exemplary method for routing remote UE traffic, according to various aspects disclosed.

FIG. 6 depicts a flow diagram outlining an example method 600 for routing remote UE traffic. The method may be performed, for example, by relay UE 101 of FIG. 1 or relay UE 301 of FIGS. 3-5. AT 610, the method includes receiving a UE route selection policy (URSP) from a network. The URSP includes respective URSP rules for routing UE traffic through respective network slices to the network. A first URSP rule indicates whether an associated first network slice is designated for remote UE traffic, relay UE traffic, or both remote UE traffic and relay UE traffic. The URSP rule may include an RSD that includes a traffic source parameter or element that indicates allowed traffic sources. The URSP rule may include a traffic descriptor that includes a traffic source parameter or element that indicates allowed traffic sources.

At 620, a D2D connection is established with a remote UE to relay remote UE traffic from the remote UE to a base station. At 630, the remote UE traffic is assigned to at least one network slice based on the URSP.

Configuration of Default Traffic Source Used when Traffic Source Element is Absent To avoid adding the traffic source element to each URSP rule, a new element can be added to define a default traffic source parameter value when the traffic source element is absent. The network can send the "default_allowed_traffic_source" parameter value to indicate how the UE is to interpret the absence of the traffic source element in a URSP rule.

As an example, for use case 1 of FIG. 3, the network could set the default_allowed_traffic_source to indicate both relay UE and remote UE traffic are permitted. Then, since all network slices in use case 1 are shared (allow both relay UE and remote UE traffic) the traffic source element would not need to be included in any URSP rule.

As an example, for use case 2 of FIG. 4, the network could set the default_allowed_traffic_source element value to indicate relay UE traffic only is permitted. Then, since S-NSSAI x and S-NSSAI y are designated as relay UE only, the traffic source element can be omitted from rules associated with these two slices. The traffic source element should be included (and set to indicate both local and remote UE traffic) in URSP rules associated with network slice S-NSSAI z.

In general, when different traffic sources are to be allowed for different network slices, the network may determine which traffic source is applicable to the most URSP rules and set the default_allowed_traffic_source element value to indicate this traffic source. In this manner the traffic source element need only be included in URSP rules associated with network slices that do not follow the majority traffic source limitation.

There are several techniques for communicating the default_allowed_traffic_source parameter to the relay UE. In one example, the network sends the default_allowed_traffic_source element as part of a URSP to UEs that have relay capability. Table 4 illustrates exemplary changes (shown in bold and italic font) to Table 6.6.2.1-1: UE Route Selection Policy of TS 23.503 to support a default_allowed_traffic_source parameter as part of a URSP.

TABLE 4

| Information name | Description | Category | PCF permitted to modify in a URSP | Scope |
|---|---|---|---|---|
| URSP rules | 1 or more URSP rules as specified in table 6.6.2.1-2 | Mandatory | Yes | UE context |
| *Default allowed traffic source* | *The default interpretation when the traffic source element is absent in a URSP rule. The value can represent local, relay, or both local and relay.* | *Optional* | *Yes* | *UE context* |

Table 5 illustrates exemplary changes (shown in bold and italic font) to Table 6.6.2.1-2: UE Route Selection Policy Rule of TS 23.503 to support a default_allowed_traffic_source parameter as part of a URSP.

TABLE 5

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Traffic descriptor | *This part defines the Traffic descriptor components for the URSP rule.* | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) or a regular expression as a domain name matching criteria. | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

NOTE 1:
Rules in a URSP shall have different precedence values.
NOTE 2:
The information is used to identify the Application(s) that is(are) running on the UE's OS. The OSId does not include an OS version number. The OSAppId does not include a version number for the application.
NOTE 3:
At least one of the Traffic descriptor components shall be present.
NOTE 4:
The format and some values of Connection Capabilities, e.g. "ims", "mms", "internet", etc., are defined in TS 24.526 [19]. More than one connection capabilities value can be provided.
NOTE 5:
A URSP rule cannot contain the combination of the Traffic descriptor components IP descriptors and Non-IP descriptors.

Referring back to FIG. 2, according to the above example the default_allowed_traffic_source element may be included in the DL NAS Transport message 220 within a policy container that contains a URSP.

In another example, the network sends the default_allowed_traffic_source parameter value with other configuration parameters as part of an authorization and provisioning message for a D2D configuration. Referring back to FIG. 2, according to this example the default_allowed_traffic_source element may be included in the DL NAS Transport message 220 within a policy container that contains a D2D configuration.

Relay Service Code in Traffic Descriptor

Relay Service Codes identify a connectivity service a UE serving as a relay provides to Public Safety applications. The Relay Service Codes may be configured in the UE for advertisement during the discovery process. The core network may determine that all data related to a certain D2D connection with a specific Relay Service Code should be routed through the same network slice. To communicate this routing limitation to the relay UE, the Relay Service Code parameter may be added to the traffic descriptor of the URSP rules as part of the DL NAS Transport Message (see 220 of FIG. 2). The relay UE uses the Relay Service Code during evaluation of the URSP rules to link remote UE traffic to an appropriate network slice. The URSP rule can include one Relay Service Code or a list of Relay Service Codes or a wild carded value applicable for all Relay Service Codes. URSP rules that indicate that remote UE traffic is allowed should include at least one Relay Service Code.

Table 6 illustrates exemplary changes (shown in bold and italic font) to Table 4.4.2.1 mapping table for traffic descriptor parameters of TS 24.526 to support a Relay Service Code parameter as part of a URSP rule traffic descriptor.

TABLE 6

| Traffic descriptor parameter name | Description | Mapped EPS parameter description |
| --- | --- | --- |
| Application descriptors | It consists of OSId and OSAppId(s) | OSId and OSAppId(s) |
| IP descriptors | Destination IP 3 tuple(s) (IP address or IPv6 network prefix, port number, protocol ID of the protocol above IP) | Destination IP 3 tuple(s) (IP address or IPv6 network prefix, port number, protocol ID of the protocol above IP) |
| Domain descriptors | Destination FQDN(s) or a regular expression as a domain name matching criteria | Destination FQDN(s) or a regular expression as a domain name matching criteria |
| Non-IP descriptors | Descriptor(s) for destination information of non-IP traffic | Descriptor(s) for destination information of non-IP traffic |
| DNN | This is matched against the DNN information provided by the application | APN |
| Connection Capabilities | This is matched against the information provided by a UE application when it requests a network connection with certain capabilities | This is matched against the information provided by a UE application when it requests a network connection with certain capabilities |
| Relay Service Code | *This is matched against the Relay Service Code configuration* | Not applicable in EPS |

Table 7 illustrates exemplary URSP rule that uses a Relay Service Code.

| Example URSP rules | | Comments |
| --- | --- | --- |
| Rule Precedence =1 | Route Selection Descriptor Precedence =1 | This URSP rule associates the traffic of remote UE which is linked to Relay Service Code 1 to use DNN_1 with DNN_1, S-NSSAI-a over 3GPP access. |
| Traffic Descriptor: Relay Service Code1 | DNN Selection: DNN_1 Network Slice Selection: S-NSSAI-a Access Type preference: 3GPP access | |

In this description and the appended claims, use of the term determine with reference to some entity (e.g., parameter, variable, and so on) in describing a method step or function is to be construed broadly. For example, determine is to be construed to encompass, for example, receiving and parsing a communication that encodes the entity or a value of an entity. Determine should be construed to encompass accessing and reading memory (e.g., lookup table, register, device memory, remote memory, and so on) that stores the entity or value for the entity. Determine should be construed to encompass computing or deriving the entity or value of the entity based on other quantities or entities. Determine should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. Derive should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. Derive should be construed to encompass computing or calculating the entity or value of the entity based on other quantities or entities. Derive should be construed to encompass any manner of deducing or identifying an entity or value of the entity.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

Figure 7:
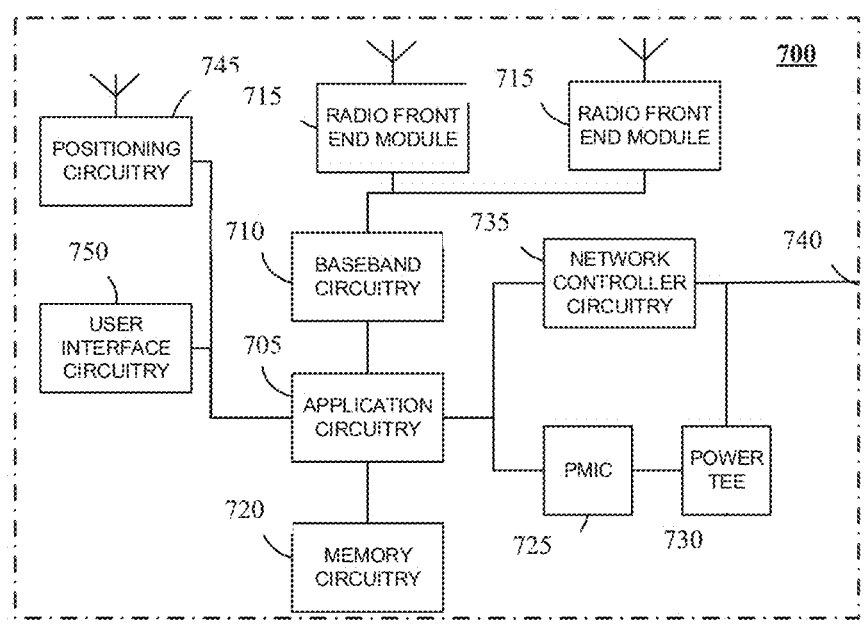
FIG. 7 illustrates an example of an infrastructure equipment, in accordance with various aspects disclosed.

FIG. 7 illustrates an example of infrastructure equipment 700 in accordance with various aspects. The infrastructure equipment 700 (or "system 700") may be implemented as a base station, radio head, RAN node such as the BS 102, network nodes 103, 104, 105, 106 of FIG. 1 and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some aspects, the device 700 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 705 may comprise, or may be, a special-purpose processor/controller to operate according to the various aspects herein. As examples, the processor(s) of application circuitry 705 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 700 may not utilize application circuitry 705, and instead may include a special-purpose processor/controller to process IP data received from an EPC or 5GC, for example.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 8:
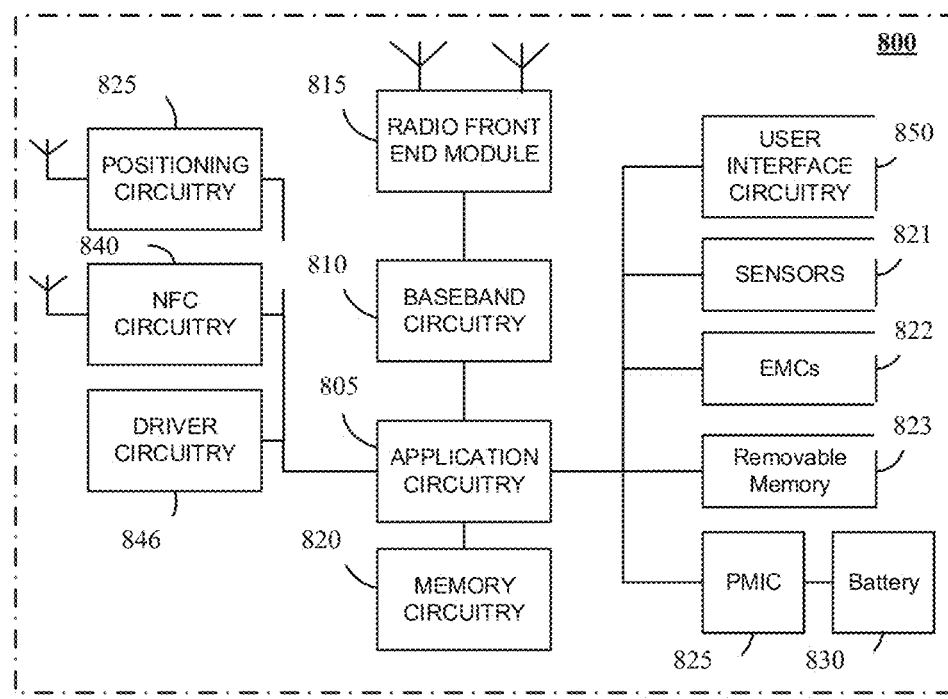
FIG. 8 illustrates an example of a UE platform, in accordance with various aspects disclosed.

FIG. 8 illustrates an example of a platform 800 (or "device 800") in accordance with various aspects. In aspects, the computer platform 800 may be suitable for use as UEs 101, 111 of FIG. 1, network nodes 103, 104, 105, 106 of FIG. 1, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, 120 or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 805 may include a general or special purpose processor, such as an A-series processor (e.g., the A13 Bionic), available from Apple® Inc., Cupertino, Calif. or any other such processor. The processors of the application circuitry 805 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package.

The baseband circuitry or processor 810 may be implemented, for example, as a solder-down substrate including one or more integrated circuits, a single packaged integrated circuit soldered to a main circuit board or a multi-chip module containing two or more integrated circuits.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

Examples can include subject matter such as a method, means for performing acts or blocks of the method, at least one machine-readable medium including instructions that, when performed by a machine cause the machine to perform acts of the method or of an apparatus or system for practicing the embodiments and examples described herein.

Example 1 is a baseband processor for a user equipment (UE), configured to cause the UE to receive a UE route selection policy (URSP) from a network, wherein the URSP includes respective URSP rules for routing UE traffic through respective network slices to the network, wherein a first URSP rule indicates whether an associated first network slice is designated for remote UE traffic, relay UE traffic, or both remote UE traffic and relay UE traffic; establish a device to device (D2D) connection with a remote UE to relay remote UE traffic from the remote UE to a base station; and assign the remote UE traffic to at least one network slice based on the URSP.

Example 2 includes the subject matter of example 1, including or omitting optional elements, wherein the first URSP rule includes a traffic source parameter that can be assigned a first value that indicates that an associated network slice is designated for remote UE traffic, a second value that indicates that an associated network slice is designated for relay UE traffic, or a third value that indicates that an associated network slice is designated for both remote UE traffic and relay UE traffic.

Example 3 includes the subject matter of example 2, including or omitting optional elements, wherein the traffic source parameter is included in a route selection descriptor of the URSP rule.

Example 4 includes the subject matter of example 2, including or omitting optional elements, wherein the traffic source parameter is included in a traffic descriptor of the URSP rule.

Example 5 includes the subject matter of example 1, including or omitting optional elements, the baseband processor further configured to cause the UE to receive, from the network, a default_allowed_traffic_source parameter value that indicates remote UE traffic, relay UE traffic, or both remote UE traffic and relay UE traffic; determine that a second URSP rule does not indicate whether an associated second network slice is designated for remote UE traffic, relay UE traffic, or both remote UE traffic and relay UE traffic; and assign traffic to the associated second network slice according the default_allowed_traffic_source parameter value.

Example 6 includes the subject matter of example 5, including or omitting optional elements, wherein the URSP includes an indication of the default allowed traffic source parameter value.

Example 7 includes the subject matter of example 5, including or omitting optional elements, the baseband processor further configured to cause the UE to receive the default_allowed_traffic_source parameter value as part of an authorization and provisioning message from the network.

Example 8 includes the subject matter of example 1, including or omitting optional elements, wherein when a URSP rule includes an indication that an associated network slice is designated for remote UE traffic or both remote UE and relay UE traffic, wherein the URSP rule includes an indication of a Relay Service Code for the associated network slice.

Example 9 includes the subject matter of example 8, including or omitting optional elements, wherein the Relay Service Code is included in a traffic descriptor of the URSP rule.

Example 10 is a processor for network node, configured to cause the network node to transmit a UE route selection policy (URSP) to a relay UE, wherein the URSP includes respective URSP rules for routing UE traffic through respective network slices to a second network node, wherein a first URSP rule indicates whether an associated first network slice is designated for remote UE traffic, relay UE traffic, or both remote UE traffic and relay UE traffic.

Example 11 includes the subject matter of example 10, including or omitting optional elements, wherein the first URSP rule includes a traffic source parameter that can be assigned a first value that indicates that an associated network slice is designated for remote UE traffic, a second value that indicates that an associated network slice is designated for relay UE traffic, or a third value that indicates that an associated network slice is designated for both remote UE traffic and relay UE traffic.

Example 12 includes the subject matter of example 11, including or omitting optional elements, wherein the traffic source parameter is included in a route selection descriptor of the URSP rule.

Example 13 includes the subject matter of example 11, including or omitting optional elements, wherein the traffic source parameter is included in a traffic descriptor of the URSP rule.

Example 14 includes the subject matter of example 10, including or omitting optional elements, the processor further configured to cause the network node to transmit a default_allowed_traffic_source parameter that provides an indication of a default traffic source designation for use when a URSP rule does not indicate whether an associated network slice is designated for remote UE traffic, relay UE traffic, or both remote UE traffic and relay UE traffic.

Example 15 includes the subject matter of example 14, including or omitting optional elements, wherein the URSP includes the indication of the default traffic source designation.

Example 16 includes the subject matter of example 10, including or omitting optional elements, the processor further configured to cause the network node to transmit, as part of an authorization and provisioning message, a default allowed traffic source parameter that provides an indication of a default traffic source designation for use when a URSP rule does not indicate whether an associated network slice is designated for remote UE traffic, relay UE traffic, or both remote UE traffic and relay UE traffic.

Example 11 includes the subject matter of example 10, including or omitting optional elements, wherein when a URSP rule includes an indication that an associated network slice is designated for remote UE traffic or both remote UE and relay UE traffic, wherein the URSP rule includes an indication of a Relay Service Code for the associated network slice.

Example 18 includes the subject matter of example 17, including or omitting optional elements, wherein the Relay Service Code is included in a traffic descriptor of the URSP rule.

Example 19 is a method, including receiving a UE route selection policy (URSP) from a network, wherein the URSP includes respective URSP rules for routing UE traffic through respective network slices to the network, wherein a first URSP rule indicates whether an associated first network slice is designated for remote UE traffic, relay UE traffic, or both remote UE traffic and relay UE traffic; establishing a device to device (D2D) connection with a remote UE to relay remote UE traffic from the remote UE to a base station; and assigning the remote UE traffic to at least one network slice based on the URSP.

Example 20 includes the subject matter of example 19, including or omitting optional elements, wherein the first URSP rule includes a traffic source parameter that can be assigned a first value that indicates that an associated network slice is designated for remote UE traffic, a second value that indicates that an associated network slice is designated for relay UE traffic, or a third value that indicates that an associated network slice is designated for both remote UE traffic and relay UE traffic.

Example 21 includes the subject matter of example 20, including or omitting optional elements, wherein the traffic source parameter is included in a route selection descriptor of the URSP rule.

Example 22 includes the subject matter of example 20, including or omitting optional elements, wherein the traffic source parameter is included in a traffic descriptor of the URSP rule.

Example 23 includes the subject matter of example 19, including or omitting optional elements, further including receiving, from the network, a default allowed traffic source parameter value that indicates remote UE traffic, relay UE traffic, or both remote UE traffic and relay UE traffic; determining that a second URSP rule does not indicate whether an associated second network slice is designated for remote UE traffic, relay UE traffic, or both remote UE traffic and relay UE traffic; and assigning traffic to the associated second network slice according the default_allowed_traffic_source parameter value.

Example 24 includes the subject matter of example 23, including or omitting optional elements, wherein the URSP includes an indication of the default allowed traffic source parameter value.

Example 25 includes the subject matter of example 23, including or omitting optional elements, further including receiving the default_allowed_traffic_source parameter value as part of an authorization and provisioning message from the network.

Example 20 includes the subject matter of example 19, including or omitting optional elements, wherein when a URSP rule includes an indication that an associated network slice is designated for remote UE traffic or both remote UE and relay UE traffic, wherein the URSP rule includes an indication of a Relay Service Code for the associated network slice.

Example 27 includes the subject matter of example 26, including or omitting optional elements, wherein the Relay Service Code is included in a traffic descriptor of the URSP rule.

Example 28 is a method that includes any action or combination of actions as substantially described herein in the Detailed Description.

Example 29 is a method as substantially described herein with reference to each or any combination of the Figures included herein or with reference to each or any combination of paragraphs in the Detailed Description.

Example 30 is a user equipment configured to perform any action or combination of actions as substantially described herein in the Detailed Description as included in the user equipment.

Example 31 is a network node configured to perform any action or combination of actions as substantially described herein in the Detailed Description as included in the network node.

Example 32 is a non-volatile computer-readable medium that stores instructions that, when executed, cause the performance of any action or combination of actions as substantially described herein in the Detailed Description.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a non-volatile computer-readable medium using instructions stored in a memory. Many other examples and variations are possible within the scope of the claimed disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor for a user equipment (UE) acting as a relay UE, configured to cause the UE to:
receive a UE route selection policy (URSP) from a network, wherein the URSP includes respective URSP rules for routing UE traffic through respective network slices to the network, wherein each URSP rule indicates whether an associated network slice is designated for remote UE traffic, relay UE traffic, or both remote UE traffic and relay UE traffic;
establish a device to device (D2D) connection with a remote UE to relay remote UE traffic from the remote UE to a base station;
assign the remote UE traffic to a first network slice designated, by a URSP rule associated with the first network slice, for remote UE traffic or both remote UE traffic and relay UE traffic; and
assign relay UE traffic of the UE to a second network slice designated, by a URSP rule associated with the second network slice, for relay UE traffic or both remote UE traffic and relay UE traffic.

2. The baseband processor of claim 1, wherein one or more of the URSP rules include a traffic source parameter configurable between a first value that indicates that an associated network slice is designated for remote UE traffic, a second value that indicates that an associated network slice is designated for relay UE traffic, or a third value that indicates that an associated network slice is designated for both remote UE traffic and relay UE traffic.

3. The baseband processor of claim 2, wherein the traffic source parameter is included in a route selection descriptor of the URSP rule.

4. The baseband processor of claim 2, wherein the traffic source parameter is included in a traffic descriptor of the URSP rule.

5. The baseband processor of claim 1, further configured to cause the UE to:
receive, from the network, a default allowed traffic source parameter value that indicates remote UE traffic, relay UE traffic, or both remote UE traffic and relay UE traffic;
determine that a URSP rule does not indicate whether an associated network slice is designated for remote UE traffic, relay UE traffic, or both remote UE traffic and relay UE traffic; and
assign traffic to the associated network slice according the default allowed traffic source parameter value.

6. The baseband processor of claim 5, wherein the URSP includes an indication of the default allowed traffic source parameter value.

7. The baseband processor of claim 5, further configured to cause the UE to receive the default allowed traffic source parameter value as part of an authorization and provisioning message from the network.

8. The baseband processor of claim 1, wherein when a URSP rule includes an indication that an associated network slice is designated for remote UE traffic or both remote UE and relay UE traffic, wherein the URSP rule includes an indication of a Relay Service Code for the associated network slice.

9. The baseband processor of claim 8, wherein the Relay Service Code is included in a traffic descriptor of the URSP rule.

10. A processor for a network node, configured to cause the network node to:
transmit a UE route selection policy (URSP) to a relay UE, wherein the URSP includes respective URSP rules for routing UE traffic through respective network slices to a second network node, wherein each URSP rule indicates whether an associated network slice is designated for remote UE traffic, relay UE traffic, or both remote UE traffic and relay UE traffic.

11. The processor of claim 10, wherein one or more of the URSP rules include a traffic source parameter configurable between a first value that indicates that an associated network slice is designated for remote UE traffic, a second value that indicates that an associated network slice is designated for relay UE traffic, or a third value that indicates that an associated network slice is designated for both remote UE traffic and relay UE traffic.

12. The processor of claim 11, wherein the traffic source parameter is included in a route selection descriptor of the URSP rule.

13. The processor of claim 11, wherein the traffic source parameter is included in a traffic descriptor of the URSP rule.

14. The processor of claim 10, further configured to cause the network node to transmit a default allowed traffic source parameter that provides an indication of a default traffic source designation for use when a URSP rule does not indicate whether an associated network slice is designated for remote UE traffic, relay UE traffic, or both remote UE traffic and relay UE traffic.

15. The processor of claim 14, wherein the URSP includes the indication of the default traffic source designation.

16. The processor of claim 10, further configured to cause the network node to transmit, as part of an authorization and provisioning message, a default allowed traffic source parameter that provides an indication of a default traffic source designation for use when a URSP rule does not indicate whether an associated network slice is designated for remote UE traffic, relay UE traffic, or both remote UE traffic and relay UE traffic.

17. The processor of claim 10, wherein when a URSP rule includes an indication that an associated network slice is designated for remote UE traffic or both remote UE and relay UE traffic, wherein the URSP rule includes an indication of a Relay Service Code for the associated network slice.

18. The processor of claim 17, wherein the Relay Service Code is included in a traffic descriptor of the URSP rule.

19. A method for a user equipment (UE) acting as a relay UE, comprising:
receiving a UE route selection policy (URSP) from a network, wherein the URSP includes respective URSP rules for routing UE traffic through respective network slices to the network, wherein each URSP rule indicates whether an associated first network slice is designated for remote UE traffic, relay UE traffic, or both remote UE traffic and relay UE traffic;
establishing a device to device (D2D) connection with a remote UE to relay remote UE traffic from the remote UE to a base station; and assigning the remote UE traffic to a first network slice designated, by a URSP rule associated with the first network slice, for remote UE traffic or both remote UE traffic and relay UE traffic; and assigning relay UE traffic of the UE to a second network slice designated, by a URSP rule associated with the second network slice, for relay UE traffic or both remote UE traffic and relay UE traffic.

20. The method of claim 19, wherein one or more of the URSP rules include a traffic source parameter configurable between a first value that indicates that an associated network slice is designated for remote UE traffic, a second value that indicates that an associated network slice is designated for relay UE traffic, or a third value that indicates that an associated network slice is designated for both remote UE traffic and relay UE traffic.

* * * * *